UNITED STATES PATENT OFFICE.

CARL CRAMER, OF ZURZACH, SWITZERLAND, ASSIGNOR TO THE FIRM: CHEMISCHE FABRIK GRIESHEIM-ELEKTRON, OF FRANKFORT-ON-THE-MAIN, GERMANY.

PROCESS FOR PRODUCING MAGNESIUM CARBONATE.

1,427,444.  Specification of Letters Patent.  Patented Aug. 29, 1922.

No Drawing.  Application filed June 12, 1922.  Serial No. 567,739.

*To all whom it may concern:*

Be it known that I, CARL CRAMER, a citizen of Switzerland, residing at Zurzach, Switzerland, have invented certain new and useful Improvements in Processes for Producing Magnesium Carbonate, of which the following is a specification.

My invention has reference to an improved process of producing carbonates of magnesium, and it is intended to facilitate the precipitation thereof by ammonium carbonate.

When ammonium carbonate is added to a dilute solution of a magnesium salt, no precipitation is produced, the precipitations only taking place upon heating the mixture to a temperature of about 50 degree C.

According to my experiments, however, a quantitative precipitation is obtained if the addition of ammonium carbonate is made to magnesia liquors containing other constituents, thus for instance to the spent liquors obtained in the manufacture of potassium salts, and containing chiefly magnesium compounds. It has been found that, if the precipitant is added to magnesium solutions of the kind referred to, and of which the mother liquors of the Stassfurt salts, and of similar deposits, are a typical instance, precipitation of carbonate will occur without exterior heat, and particularly if the mixture is submitted to a mechanical agitation involving interior mechanical work, and the accompanying interior heat. By this means the necessary interior energy is produced whereby this reaction for practical purposes becomes, so to speak, exothermic. This mechanical labor is, preferably furnished by means of a turbine or similar motor which has been suggested heretofore for the homogenization of mixtures of difficultly miscible substances of different degrees or stages of solidity and surface tension, and as disclosed as an instance in United States Patent No. 1,387,832, dated August 16, 1921 and granted to Otto F. Brumann. Such turbines or homogenization devices are preferably driven by a motor engine comprising one or more rotors.

By proceeding in this manner the production of magnesium carbonate becomes highly economical, particularly as regards the saving of fuel and of wages; and it is considerably simplified.

*Example.*—100 parts of a 2.5 per cent solution of magnesium chloride and 100 parts of a solution of molecular proportions of ammonium carbonate are intimately mixed in the cold in a homogenization effecting device, provided for instance with a turbine, operated by a motor engine with one or more rotors. After the turbine has been operated for about 15 minutes the liquid is run off and filtered, in order to separate it from the precipitate which has the formula $MgCO_3 \cdot H_2O$, which is then dried. From the neutral carbonate thus produced, basic carbonate may be obtained by dispersing the wet product obtained in suspension in an appropriate quantity of water heated to about 40 to 50 degrees C., the mixture being then introduced into a homogenization device of the kind described. By working the turbine for some time the magnesium carbonate will be converted into basic magnesium carbonate with the liberation of carbon dioxide which escapes into the atmosphere. This conversion is going on very rapidly and at a quantitative rate. The final product of the reaction is exceedingly fluffy or voluminous, and in this respect possesses all the desirable qualities required by the consumers.

The new method of treatment according to this invention is not limited to magnesium carbonate of the particular kind and sources hereinbefore referred to, but it may also be carried out and utilized to aid in the precipitation of magnesium carbonate from solutions of other sources as well. Particularly as regards the preparation of the basic carbonate, it is greatly superior to the old method, and much more economical, inasmuch as the old method which, on account of the consumption of fuel, is rather expensive, requires the boiling of the suspended magnesium carbonate with water for a comparatively long time, in order to split off part of the carbon dioxide.

In the practice of this part of my invention I may, for instance, proceed as follows:—

A mixture consisting of 50 kilograms neutral magnesium carbonate ($MgCO_3, 3H_2O$) free from the mother liquors of its production, and of 5000 kilograms of water is submitted for about ten minutes to the action of a turbine, as above described, at a tepid temperature of about forty degrees C. The mixture is then filtered, and a product is obtained containing 44% MgO and 36% $CO_2$ and consisting of basic magnesium carbonate in accordance with the formula:—

$$4MgO.3CO_2.4H_2O.$$

It will be understood that by the term homogenization as used herein is meant intense mechanical agitation.

I claim:—

1. The process of producing carbonates of magnesium by mutual decomposition of ammonium carbonate with soluble magnesium salts, which comprises submitting the mixture to agitation.

2. In the process of producing magnesium carbonates, treating mother liquors from potassium carrying magnesium salts with ammonium carbonate as the precipitating agent, and submitting the mixture to agitation.

3. In the process of producing magnesium carbonates, treating solutions of magnesium salts with ammonium carbonate, and submitting the mixture at tepid temperature to agitation until basic carbonate is precipitated with the evolution of carbondioxide.

4. The process of producing magnesium carbonates, which consists in treating the mother liquors of potassium carrying magnesium salts with ammonium carbonate, submitting the mixture to agitation and continuing the treatment until carbon dioxide is evolved and basic carbonate is precipitated.

5. The method of producing magnesium carbonates from magnesium salts, which consists in submitting a solution of said salts to the action of ammonium carbonate, and intensely agitating the mixture by means of a motor driven turbine possessing one or more rotors.

6. The method of producing basic magnesium carbonate from magnesium salts which consists in treating a solution of spent liquors from the manufacture of potassium salts, and containing magnesium salts with ammonium carbonate, agitating the mixture, and agitating the ensuing precipitate with water at a temperature of from 40 to 50 degrees C. by means of a motor driven turbine possessing one or more rotors.

7. The process of producing magnesium carbonate which comprises treating solutions of magnesium salts with ammonium carbonate and intensely agitating the mixture for a period of about fifteen minutes and filtering out the precipitate.

8. The process of producing magnesium carbonate which comprises treating solutions of magnesium salts with ammonium carbonate, agitating the mixture for a period of about fifteen minutes, then again agitating the ensuing precipitate free from mother liquors with tepid water for a period of about ten minutes.

In testimony whereof I affix my signature.

CARL CRAMER.

Witnesses:
J. A. DURST,
D. W. KAPPELER.